United States Patent [19]
Brooks

[11] 3,936,839
[45] Feb. 3, 1976

[54] METHOD AND SYSTEM FOR MONITORING THE LIGHT OUTPUT OF PYROTECHNIC LUMINANTS UNDER DYNAMIC CONDITIONS

[75] Inventor: Wahner E. Brooks, Yuma, Ariz.

[73] Assignee: The United States of America as represented by the Secretary of the Army, Washington, D.C.

[22] Filed: Apr. 14, 1975

[21] Appl. No.: 567,897

[52] U.S. Cl. .................... 346/1; 346/33 A; 346/38; 346/107 R; 250/578
[51] Int. Cl.² .. G01D 9/00; G01D 9/42; H01J 39/12
[58] Field of Search .............. 346/1, 33 A, 38, 107; 102/1 R; 235/61.5 R; 250/578

[56] References Cited
UNITED STATES PATENTS

| | | | |
|---|---|---|---|
| 2,993,195 | 7/1961 | Groce ......................... | 346/107 R X |
| 3,181,169 | 4/1965 | Marchal et al.................. | 346/107 R |
| 3,346,866 | 10/1967 | Bechtel ....................... | 346/107 R X |
| 3,801,821 | 4/1974 | Sharpe et al.................... | 250/578 X |
| 3,831,035 | 8/1974 | Hill .................................. | 250/578 |

*Primary Examiner*—George H. Miller, Jr.
*Attorney, Agent, or Firm*—Nathan Edelberg; Robert P. Gibson; Saul Elbaum

[57] ABSTRACT

The light output of pyrotechnic luminants under dynamic conditions can be monitored to obtain data representative of ground surface illumination as a function of time and position of the illumination source. An array of photocells is disposed at substantially ground level throughout the range testing area, these photocells being sequentially scanned to provide a serial electrical data output during the firing of a pyrotechnic luminant-containing projectile over the range testing area. The serial data is transmitted to a remote control location whereat the data is received, sequentially demodulated, and converted into an optical display synchronously with the scanning in a pattern which simulates the illumination impinging on the photocell array. The position of the projectile over the range testing area is simultaneously tracked and a tracking information display is also provided. The illumination display pattern is recorded in correlation with the tracking information display so as to provide a frame-by-frame record of the ground surface illumination of the luminant as a function of time and the position of the illumination source.

5 Claims, 1 Drawing Figure

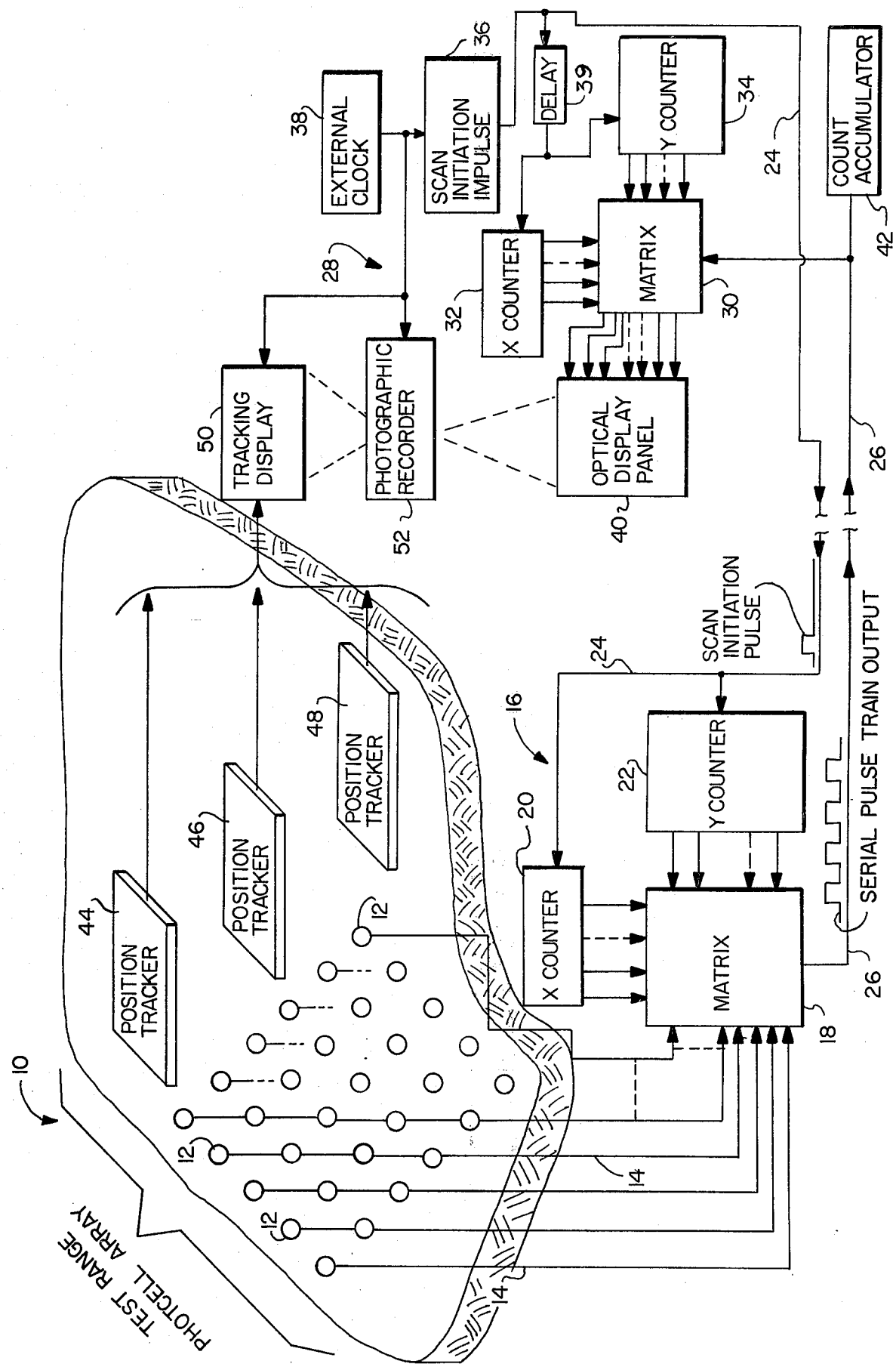

METHOD AND SYSTEM FOR MONITORING THE LIGHT OUTPUT OF PYROTECHNIC LUMINANTS UNDER DYNAMIC CONDITIONS

RIGHTS OF THE GOVERNMENT

The invention described herein may be manufactured, used and licensed by or for the United States Government for governmental purposes without the payment to the inventor of any royalties thereon.

BACKGROUND OF THE INVENTION

This invention generally relates to illumination monitoring systems and is particularly concerned with a system and method for monitoring the light output of pyrotechnic luminants under dynamic conditions so as to obtain data representative of ground surface illumination as a function of time and position of the illumination source.

The present invention has particular applicability in evaluating the effectiveness of pyrotechnic luminants such as flares in terms of the capability thereof of actually illuminating a target. In the design of a complete flare system, the ability thereof to provide a relatively high level of ground illumination is the primary criteria for effectiveness. In this respect, the intensity of the ground illumination is of concern, as is the illumination pattern, spectral characteristics thereof, and the time-variation of illumination intensity. In a dynamic situation wherein a projectile carrying a pyrotechnic luminant is fired, further variables enter into an evaluation of illumination effectiveness, such as the height, trajectory, and burn-time of the projectile.

So as to facilitate the design of such flares and related systems, pyrotechnic luminants presently are evaluated statically in test tunnels and on towers where light intensity is measured, and dynamically by measuring their trajectory and burn-time during actual firing. Light intensity data as well as trajectory data are then mathematically manipulated into a calculated estimate of the flare's ground-illumination. The present methods as discussed at best rely upon estimates and complicated calculations in determining the effectiveness of a luminant in that such present methods do not evaluate the actual effectiveness of the complete flare system in terms of actually illuminating a ground target.

SUMMARY OF THE INVENTION

It is thus apparent that a need exists in this art by which the actual ground-illumination effectiveness of a pyrotechnic luminant can be monitored under dynamic conditions, and it is the primary objective of the instant invention to provide such a method and system.

A further objective of the instant invention is to provide a method and system by which output such as illumination, duration, and pattern of a flare can be evaluated under dynamic conditions which approximate that to be found under actual tactical situations.

These objectives, as well as others which will become apparent as the description proceeds, are implemented by the novel invention which will be seen to constitute both a method and a system for monitoring the light output of pyrotechnic luminants under dynamic conditions to obtain data representative of ground surface illumination as a function of time and position of the illumination source.

To this end, the system contemplates the disposition of an array of spaced-apart light sensing means, such as photocells, at substantially ground level throughout a range testing area. A pyrotechnic luminant-containing projectile or flare is then fired over a range testing area so as to commence a testing period. Each light sensing means is sequentially scanned at the range testing location so as to provide serial electrical data which is representative of the output of the light sensing array in response to the pyrotechnic illumination characteristics.

At a location remote from the range testing area, the electrical data is received and is sequentially demodulated, the received data then being converted into an optical display synchronously with the scanning of the light sensing array, the optical display being provided in a pattern which simulates the illumination impinging on the array of light sensing means disposed throughout the range testing area.

Simultaneously with the above-mentioned data acquisition, the position of the projectile is tracked over the range testing area and a tracking information display representative of the projectile position is provided. The illumination display pattern is then recorded, preferably in a photographic manner, in correlation with the tracking information system display so as to provide a frame-by-frame record of the ground surface illumination as a function of time and position of the illumination source throughout the testing period.

BRIEF DESCRIPTION OF THE DRAWINGS

The invention will be better understood and further features and advantages thereof will become apparent from the following detailed description of a preferred inventive embodiment, such description making reference to the appended sheet of drawing wherein the single FIGURE thereon represents a generalized monitoring system constructed in accordance with the teachings herein.

DETAILED DESCRIPTION OF A PREFERRED EMBODIMENT

Reference now being made to the appended sheet of drawing, an overall pyrotechnic evaluation system constructed in accordance with the teachings of the instant invention is disclosed, this system, as aforementioned, being capable of providing data representative of ground surface illumination of a pyrotechnic luminant as a function of time and position of the illumination source.

Disposed substantially at ground level throughout a range testing area is an array of photocell light sensors generally designated by reference numeral 10, each photocell sensor 12 being spaced-apart from one another by a distance of approximately 450 feet, the entire photocell array covering an area in excess of 200,000 square feet which, in the preferred inventive embodiment, is an area which approximates the ground area illuminated above a certain threshold level such as 0.05 or 0.20 foot-candles as occurs during tactical situations. Each of the photocells 12 is contemplated to comprise a highly stable silicon solar cell preferably coupled with a cosine correction filter and a spectra filter to correct the response of the photocell to substantially match that of the human eye.

A projectile containing a pyrotechnic luminant such as a flare is contemplated to be fired over the range testing area and thus over the photocell array 10. Light from the decending flare reaching each photocell 12 would, in conventional fashion, cause a current to be produced proportional to the intensity of the impinging illumination. This current, after amplification and "quantizing," i.e. exceeding a threshold level such as that which would be produced with an impinging illumination of 0.05 foot-candles or 0.20 foot-candles, is carried along conductors 14 to a field-commutator unit generally designated by reference numeral 16 which serve to sequentially scan the output of each photocell 12 of the array 10 to provide serial electrical data representative of the output in response to the pyrotechnic illumination characteristics.

The field-commutator unit 16 comprises a multi-position matrix 18 of conventional construction into which the output signal from each photocell 12 is fed via conductors 14. An X-counter 20 and a Y-counter 22 are coupled to the matrix 18 so as to sequentially scan same, again in conventional fashion, counters 20 and 22 each constituting ring counters arranged to interrogate the matrix upon receipt of a scan initiation pulse along conductor 24. If a positive signal appears at any point in the matrix 18 corresponding to an output from a photocell sensor 12 exceeding a threshold value, that signal is serially transmitted on output 26 during the period that the counters 20 and 22 are interrogating that position. In accordance with the preferred construction of the instant invention, a five micro-second scan initiation pulse is utilized, the matrix 18 includes 361 positions, the counters 20 and 22 constitute nineteen-point ring counters, each position interrogation consumes 15 micro-seconds and in approximately 6 milli-seconds, one complete scan of the test range field is accomplished.

At a location remote from the location of the test range, a control console is provided generally designated by reference numeral 28. The function of the control console 28 is to receive the serially generated data, demodulate and display same, and to provide the scan initiation pulses and other time-control functions.

In this respect, the serial pulse train output from the field unit 16 transmitted on cable or conductor 26 provides the input to an additional matrix decoder 30 of construction substantially identical to that of matrix 18, element 30 serving to decommutate the serial data in accordance with an interrogation or scanning effected by X-counter 32 and Y-counter 34, respectively.

In this respect, the operation of the demodulating or decommutating matrix 30 is controlled by the scan initiation pulse as would be generated by scan initiation pulser 36 under the control of an external clock 38 or other timing mechanism. The scan initiation pulse is transmitted, as is shown, along conductor 24 to the test range apparatus, and additionally to the X-counter and Y-counter 32 and 34 of the control console demodulating apparatus through a delay means 39. Delay means 39 serves to introduce a delay to allow the scan pulse time to travel the distance from the control location to the test range and for the serial pulse train output thereat generated to travel back to the control console. In practice, the delay approximates 30 micro-seconds and serves to synchronize the arrival of the first pulse of the serial pulse train output on line 26 with the interrogation of the first position of the decommutator matrix 30 by the X and Y-counters 32 and 34, respectively.

The output from the decommutator matrix 30 is provided directly to an optical display panel 40 which serves to convert the received data into an optical display sychronously with the test range scanning and in a pattern which simulates the illumination impinging on the array of light sensing photocells 12 throughout the range testing area. Specifically, if a positive pulse signal of the serial pulse train output on line 26 reaches the decommutator matrix 30 at the exact instant the X and Y-counters 32 and 34 are interrogating a position in the matrix, that signal is channeled to a lamp on the optical display panel 40 which corresponds to the matrix position being interrogated. The timing sequence of the system is such that a position in the decommutator matrix 30 is interrogated at the exact instant that the serial pulse train signal on line 26, corresponding to the same position within the field commutator matrix 18, reaches that position in the decommutator matrix 30. This assures that the lamp is illuminated on the display panel which corresponds to the sensor position in the photocell array of the test range which has provided the serial pulse.

In addition to the optical display pattern so provided, the serial pulse train output 26 is further channeled to a count accumulator or pulse counter 42 which will serve to count the number of pulses returning from the field position and display such count. This count provides a proportional approximation of the ground area illuminated by the flare above a predetermined threshold level.

The instant inventive technique further requires the simultaneous tracking of the position of the flare or projectile over the range testing area so as to additionally provide a display representative of acquired tracking information, this information being utilized by the system to correlate the illumination display pattern with the position of the illumination source over the test range. To this end, three position trackers identified by reference numerals 44, 46 and 48 are disposed in a line substantially parallel to the edge of the test range, position trackers 44–48 preferably constituting conventional cinetheodolites such as Askania KTH 59 with Askania K 53 mechanisms. Each position tracker 44 is framed from a central control point which preferably operates from the same timing source or clock 38 as is shown. A tracking display 50 is coupled to the output of the position tracker so as to provide a display representative of acquired tracking information.

The instant invention further contemplates the provision of a means which will record the illumination display pattern from the optical display panel 40, as well as the tracking information display 50, in correlation with one another. To this end, a photographic recorder is schematically illustrated and identified by reference numeral 52. In the preferred inventive embodiment, the photographic recorder 52 preferably constitutes a 35-mm pulsing camera such as that produced by Automax, the camera being framed under the control of the same timing device such as clock 38 which operates the remainder of the system, again ensuring correlated data and synchronised response. The photographic recorder 52 will therefore produce a frame-by-frame record of the optical display pattern on panel 40 as such pattern continuously varies throughout a testing period, the recorded optical display pattern further being correlated with the position of the illuminating source to provide a record by which evaluation of the flare can be readily accomplished.

While there has been shown and described a preferred embodiment of the instant invention, it will be apparent to those skilled in the art that many modifications of the structural details of the preferred system can be obviously achieved. For example, modulators and demodulators of a form other than that depicted herein could be utilized, and the data link between the test range and the remote control location could be accomplished via a radio-link rather than through cable. Further the recording means of the data acquired need not be photographic in all instances, but could, for example, constitute a computer-generated display. Further, the information acquired by the photocell array of the test range could be recorded on multi-channel magnetic tape in a further system variant. Therefore, the scope of the instant invention is to be construed by the following claims.

Accordingly, what is claimed is:

1. A method of monitoring the light output of pyrotechnic luminants under dynamic conditions to obtain data representative of ground surface illumination as a function of time and position of the illumination source, said method comprising the steps of:
    disposing an array of spaced-apart light sensing means at substantially ground level throughout a range testing area;
    firing a pyrotechnic luminant-containing projectile over the range testing area to commence a testing period;
    sequentially scanning each light sensing means to provide serial electrical data representative of the output of each light sensing means in response to the pyrotechnic illumination characteristics;
    receiving the electrical data at a location remote from the range testing area;
    sequentially demodulating the received electrical data and converting same into an optical display synchronously with said scanning in a pattern simulating the illumination impinging on the array of light sensing means throughout the range testing area;
    simultaneously tracking the position of the projectile over the range testing area and providing a display representative of acquired tracking information; and
    recording the illumination display pattern in correlation with the tracking information display.

2. A method as defined in claim 1, wherein each light sensing means disposed in the array provides an output in response to illumination imprinting thereon of an intensity in excess of a threshold level.

3. A method as defined in claim 2, wherein the sequential scanning of each light sensing means in the array and the sequential demodulation, conversion, and display of the received data is effected continuously throughout the testing period to produce a time-varying optical display pattern, and wherein the display pattern and tracking information display is photographically recorded at a plurality of discrete time intervals.

4. A method as defined in claim 3, further including the step of automatically counting the received serial electrical data for each sequential scanning of the array and providing a read-out indicative of the cumulative illumination impinging on the array.

5. A system for monitoring the light output of pyrotechnic luminants under dynamic conditions to obtain data representative of ground surface illumination as a function of time and position of the illumination source, said system comprising:
    an array of spaced-apart light sensing means disposed at substantially ground level throughout a range testing area;
    means disposed at the location of the array for sequentially scanning each light sensing means to provide serial electrical data representative of the output thereof in response to pyrotechnic illumination characteristics;
    means disposed at a location remote from the range testing area for receiving the electrical data and sequentially demodulating same;
    means for converting the received data into an optical display pattern in synchronism with said scanning, said pattern simulating the pattern of illumination impinging on the array of light sensing means throughout the range testing area;
    means for simultaneously tracking the position of the projectile over the range testing area and for providing a display representative of acquired tracking information; and
    recording means for recording the illumination display pattern in correlation with the tracking information display.

* * * * *